US012670694B2

(12) United States Patent
Jiang

(10) Patent No.: US 12,670,694 B2
(45) Date of Patent: Jun. 30, 2026

(54) SYSTEM AND METHOD FOR COMPRESSING IMAGE DATA IN A DISPLAY PANEL

(71) Applicant: Kunshan Yunyinggu Electronic Technology Co., Ltd., Kunshan (CN)

(72) Inventor: Yongwen Jiang, Kunshan (CN)

(73) Assignee: KUNSHAN YUNYINGGU ELECTRONIC TECHNOLOGY CO., LTD., Kunshan (CN)

( * ) Notice: Subject to any disclaimer, the term of this patent is extended or adjusted under 35 U.S.C. 154(b) by 362 days.

(21) Appl. No.: 18/404,993

(22) Filed: Jan. 5, 2024

(65) Prior Publication Data

US 2025/0193417 A1      Jun. 12, 2025

Related U.S. Application Data

(63) Continuation of application No. PCT/CN2023/138282, filed on Dec. 12, 2023.

(51) Int. Cl.
*G06V 10/74* (2022.01)
*G09G 3/20* (2006.01)
(Continued)

(52) U.S. Cl.
CPC ............. *G06V 10/761* (2022.01); *G09G 5/10* (2013.01); *G09G 3/2007* (2013.01);
(Continued)

(58) Field of Classification Search
CPC ............... H10K 59/126; H10K 59/122; H10K 59/1213; H10K 59/1216; H10K 59/123;
(Continued)

(56) References Cited

U.S. PATENT DOCUMENTS

2009/0027410 A1* 1/2009 Inuzuka ............... H04N 19/176
345/530
2009/0148059 A1* 6/2009 Matsuda ................. G06T 9/008
382/251
(Continued)

OTHER PUBLICATIONS

Matsushiro Nobuhito Image-Encoding Method and Device and Image-Decoding Method and Device May 6, 1998 Oki Data KK JPH10117287A para. 23-97 Figs. 1-9 English.*
Matsushiro Nobuhito Image-Encoding Method and Device and Image-Decoding Method and Device May 6, 1998 Oki Data KK JPH10117287A para. 23-97 Figs. 1-9 japanese.*
(Continued)

*Primary Examiner* — Prabodh M Dharia
(74) *Attorney, Agent, or Firm* — Bayes PLLC

(57) ABSTRACT

A method for compressing image data in a display panel is provided. The method includes grouping a plurality of pixels of the display panel into a plurality of continuous blocks and selecting a pixel pattern for a current block from a plurality of pixel patterns. Each block includes a pixel array with M rows and N columns. The indexes are assigned to the pixel patterns. Each pixel pattern includes a pixel array of M rows and N columns, and part of pixels in the pixel array of each pixel pattern are compressed. The method further includes obtaining a similarity between a current block and a previous block, and then coding the current block through a first coding mode in response to the similarity complying with a preset similarity or coding the current block through a second coding mode in response to the similarity not complying with the preset similarity.

19 Claims, 11 Drawing Sheets

<u>400</u>

(51) Int. Cl.

| | |
|---|---|
| *G09G 3/3208* | (2016.01) |
| *G09G 3/36* | (2006.01) |
| *G09G 5/10* | (2006.01) |

(52) U.S. Cl.
CPC ............. *G09G 3/3208* (2013.01); *G09G 3/36* (2013.01); *G09G 3/3607* (2013.01); *G09G 2320/0233* (2013.01)

(58) Field of Classification Search
CPC ............. H10K 59/124; H10K 59/1315; H10K 59/131; H10K 59/35; H10K 59/40; H10K 59/82; H10K 50/865; H10D 86/451; H10D 86/60; H10D 86/423; H10D 89/10; G09G 2300/0426; G09G 2300/0809; G09G 2300/0819; G09G 2300/0842; G09G 2300/0861; G09G 2320/0233; G09G 2320/0238
USPC ......................................................... 345/501
See application file for complete search history.

(56) References Cited

U.S. PATENT DOCUMENTS

| | | | | |
|---|---|---|---|---|
| 2009/0322713 | A1* | 12/2009 | Furihata | H04N 19/186 |
| | | | | 345/204 |
| 2011/0176608 | A1* | 7/2011 | Kim | H04N 19/61 |
| | | | | 375/E7.243 |
| 2016/0212420 | A1* | 7/2016 | Amon | H04N 19/14 |
| 2017/0332090 | A1* | 11/2017 | Furihata | H04N 19/136 |
| 2022/0385923 | A1* | 12/2022 | Kim | H04N 19/593 |
| 2024/0137555 | A1* | 4/2024 | Filippov | H04N 19/52 |
| 2025/0008122 | A1* | 1/2025 | Zhao | H04N 19/172 |

OTHER PUBLICATIONS

Matsushiro Nobuhito Similar Image Retrieving Device Apr. 13, 2001 Oki Data Corp JP2001101407A paras.20-61, Figs. 1-7 Description English.*

Matsushiro Nobuhito Similar Image Retrieving Device Apr. 13, 2001 Oki Data Corp JP2001101407A paras.20-61, Figs. 1-7 Description Japanese.*

* cited by examiner

400

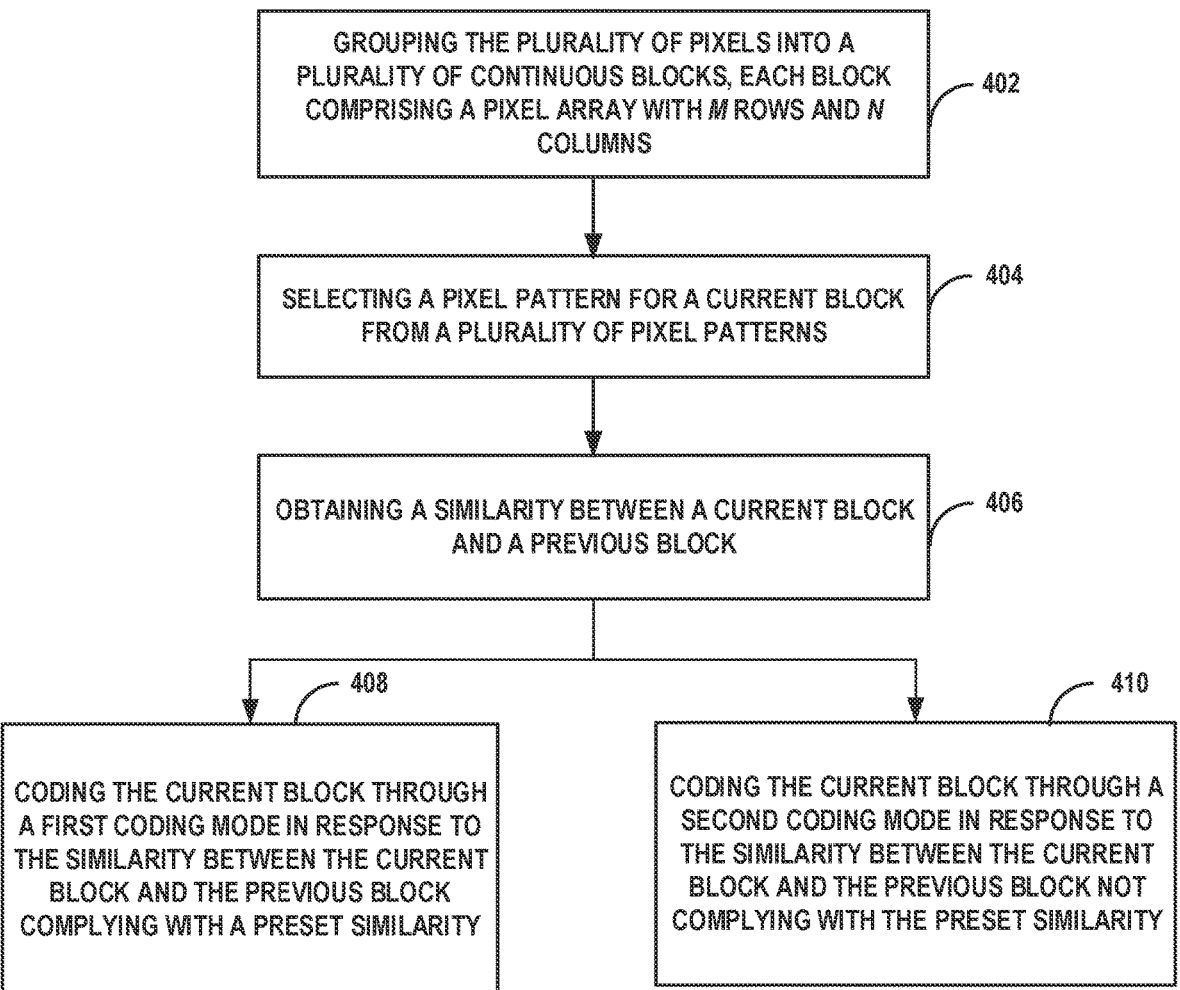

GROUPING THE PLURALITY OF PIXELS INTO A
PLURALITY OF CONTINUOUS BLOCKS, EACH BLOCK
COMPRISING A PIXEL ARRAY WITH *M* ROWS AND *N*
COLUMNS — 402

SELECTING A PIXEL PATTERN FOR A CURRENT BLOCK
FROM A PLURALITY OF PIXEL PATTERNS — 404

OBTAINING A SIMILARITY BETWEEN A CURRENT BLOCK
AND A PREVIOUS BLOCK — 406

CODING THE CURRENT BLOCK THROUGH
A FIRST CODING MODE IN RESPONSE TO
THE SIMILARITY BETWEEN THE CURRENT
BLOCK AND THE PREVIOUS BLOCK
COMPLYING WITH A PRESET SIMILARITY — 408

CODING THE CURRENT BLOCK THROUGH A
SECOND CODING MODE IN RESPONSE TO
THE SIMILARITY BETWEEN THE CURRENT
BLOCK AND THE PREVIOUS BLOCK NOT
COMPLYING WITH THE PRESET SIMILARITY — 410

TRANSFERING PIXEL DATA FROM RGB SPACE INTO YUV SPACE OR YCBCR COLOR SPACE IN RESPONSE TO THE PIXELS COMPRISES THREE DATA CHANNEL — 602

DOWNSCALING THE DATA OF THE PLURALITY OF PIXELS — 604

TRANSFERRING DATA OF THE PLURALITY OF PIXELS FROM A TIME DOMAIN INTO A FREQUENCY DOMAIN — 606

QUANTIFYING THE DATA OF THE PLURALITY OF PIXELS IN THE FREQUENCY DOMAIN — 608

| checksum | Index0 | Data0 | Index1 | Data1 | Index2 | Index3 | Data3 |
|----------|--------|-------|--------|-------|--------|--------|-------|

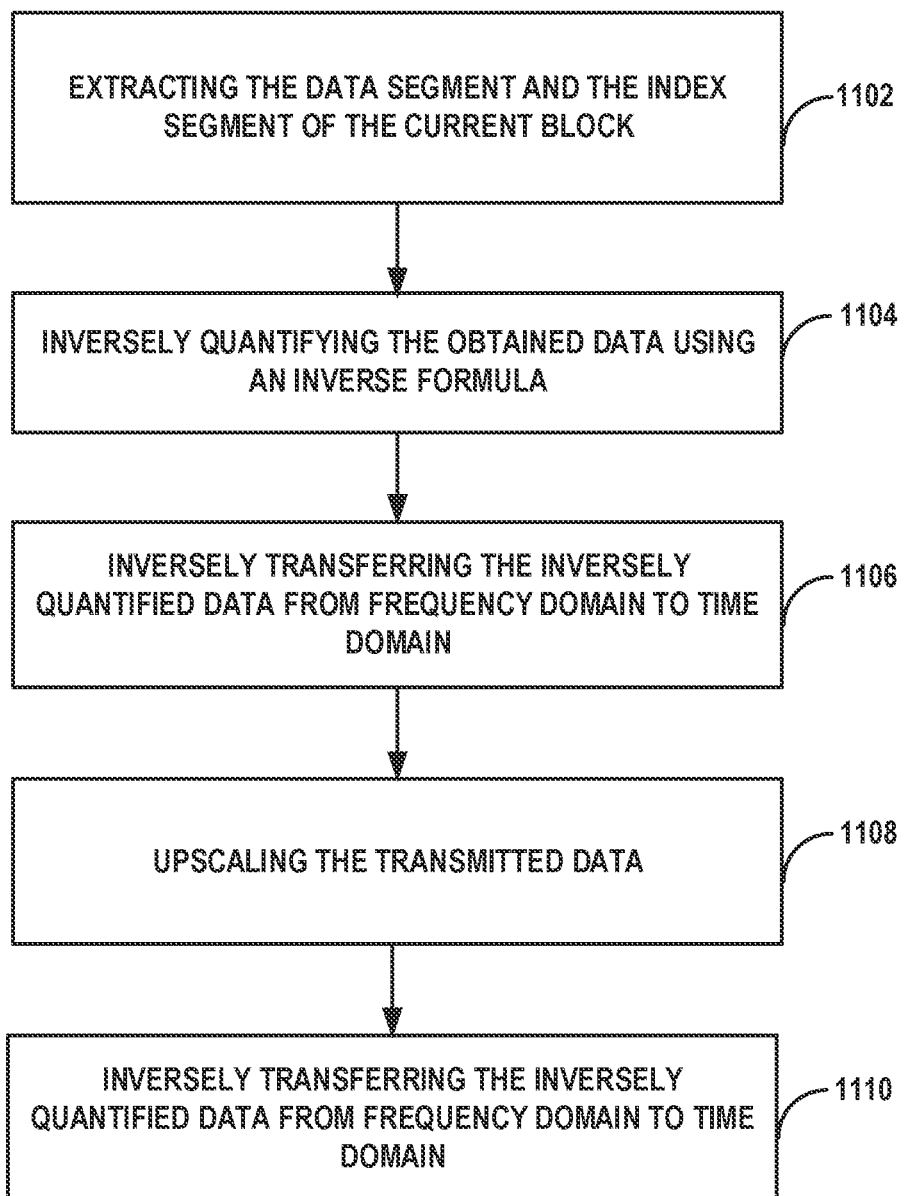

EXTRACTING THE DATA SEGMENT AND THE INDEX SEGMENT OF THE CURRENT BLOCK ⌐1102

INVERSELY QUANTIFYING THE OBTAINED DATA USING AN INVERSE FORMULA ⌐1104

INVERSELY TRANSFERRING THE INVERSELY QUANTIFIED DATA FROM FREQUENCY DOMAIN TO TIME DOMAIN ⌐1106

UPSCALING THE TRANSMITTED DATA ⌐1108

INVERSELY TRANSFERRING THE INVERSELY QUANTIFIED DATA FROM FREQUENCY DOMAIN TO TIME DOMAIN ⌐1110

FIG. 11

SYSTEM AND METHOD FOR COMPRESSING IMAGE DATA IN A DISPLAY PANEL

CROSS-REFERENCE TO RELATED APPLICATIONS

This application is a continuation of International Application No. PCT/CN2023/138282, filed on Dec. 12, 2023, which is incorporated herein by reference in its entirety.

BACKGROUND

The disclosure relates generally to display technologies, and more particularly, to a system and a method for compressing image data in a display panel.

Image data need to be compressed during transmission to improve data transmission efficiency, and a higher compression rate would lead to a higher data transmission efficiency and a smaller memory capacity. However, with the increase of the compression rate, a higher performance of a producer of the display is required. An excessively large compression rate may cause the decompressed image to be distorted, resulting in a poor quality of the image presented by the display panel.

SUMMARY

The disclosure relates generally to display technologies, and more particularly, to a system and a method for compressing image data in a display panel.

In one example, a method for compressing image data in a display panel having a plurality of pixels is provided. The method includes grouping the plurality of pixels into a plurality of continuous blocks and selecting a pixel pattern for a current block from a plurality of pixel patterns. Each block includes a pixel array with M rows and N columns, where M and N are positive integers. A plurality of indexes are assigned to the plurality of pixel patterns one-by-one, each pixel pattern including a pixel array of M rows and N columns, and part of pixels in the pixel array of each pixel pattern are compressed. The method further includes obtaining a similarity between a current block and a previous block, and then coding the current block through a first coding mode in response to the similarity between the current block and the previous block complying with a preset similarity or coding the current block through a second coding mode in response to the similarity between the current block and the previous block not complying with the preset similarity. The first coding mode includes an index of a pixel pattern assigned to the current block; the second coding mode includes the index of the pixel pattern assigned to the current block plus a first number of contents. A bit width of the first coding mode is shorter than a bit width of the second coding mode.

In one implementation, selecting a pixel pattern for the current block includes selecting a first group of pixels and a second group of pixels from the current block based on each pixel pattern of the plurality of pixels patterns, calculating a first average value of the first group of pixels and a second average value of the second group of pixels, and assigning a pixel pattern to the current block in response to the first average value corresponding to the pixel pattern being larger than a minimum average threshold and the second average value corresponding to the pixel pattern beings smaller than a maximum average threshold. The first group of pixels are located at the same positions as the pixels not being compressed from the corresponding pixel pattern; and the second group of pixels are located at the same positions as the pixels being compressed from the pixel pattern.

In one implementation, when the current block is assigned with more than one pixel pattern, selecting a pixel pattern from the more than one pixel pattern by comparing more than one first average value corresponding to the more than one pixel pattern and assigning the pixel pattern with a largest first average value to the current block.

In one implementation, selecting a pixel pattern for the current block includes selecting a third group of pixels from the current block based on each pixel pattern of the plurality of pixels patterns, calculating a sum value of the third group of pixels for each pixel pattern and assigning a pixel pattern corresponding to a largest sum value to the current block, wherein the third group of pixels are located at same positions as the pixels not being compressed from the pixel pattern.

In one implementation, a number of the compressed pixels in the pixel array of each pixel pattern is different from the other pixels patterns and/or locations of the compressed pixels in the pixel array of each pixel pattern are different from the other pixels patterns.

In one implementation, the similarity includes a first difference between a value of a first group of pixels in the current block and a value of a first group of pixels in the previous block. The preset similarity is a maximum value of the first difference and the similarity complies with the preset similarity in response to the first difference being smaller than the maximum value of the first difference.

In one implementation, the similarity includes a second difference between a value of an ith pixel in the current block and a value of an ith pixel in the previous block, where i is a positive integer and $M \times N \geq i \geq 2$, the preset similarity is a maximum value of the second difference; and the similarity complies with the preset similarity in response to the second difference being smaller than the maximum value of the second difference.

In one implementation, the similarity includes a third difference obtained by accumulating at least part of the second differences from a second pixel to a (M×N)th pixel, the preset similarity is a maximum value of the third difference, and the similarity complies with the preset similarity in response to the second difference being smaller than the maximum value of the second difference.

In one implementation, the method further includes obtaining a flatness between the current block and the previous block in response to the similarity between the current block and the previous block not complying with the preset similarity, coding the current block through a third coding mode in response to the flatness between the current block and the previous block complying with a preset flatness, or coding the current block through the second coding mode in response to the flatness between the current block and the previous block not complying with a preset flatness. The third coding mode includes the index of the pixel pattern assigned to the current block plus a second number of contents. The second number of contents is smaller than the first number of contents, and a bit width of the third coding mode is shorter than the bit width of the second coding mode and is longer than the bit width of the first coding mode.

In one implementation, the flatness includes a first ratio vector obtained by dividing the current block with an absolute value or an average value of an internal vector of the current block. The internal vector is an M-dimensional-vector or a N-dimensional-vector including a first pixel of the current block, the preset flatness includes an average value of the first ratio vector and a peak value of the first ratio vector, and the flatness complies with the preset flatness in response to an average value of the first ratio vector being smaller than the average value of the first ratio vector and a maximum value of the first ratio vector being smaller than the peak value of the first ratio vector.

In one implementation, the flatness includes a second ratio obtained by comparing at least one of a maximum value, a minimum value, or an average value of a second to a $(M \times N)$th pixels of the current block with a value of a first pixel of the current block, the preset flatness is a preset scope [a, b], where a and b are positive numbers and $a < 1 < b$, and the flatness complies with the preset flatness in response to the second ratio being within the preset scope [a, b].

In one implementation, the method further includes obtaining a capacity of a buffer configured to store the compressed image, and coding the current block through a fourth coding mode in response to the capacity of the buffer being less than a capacity threshold, or coding the current block through a second coding mode in response to the capacity of the buffer being larger than or equal to a capacity threshold. The fourth coding mode includes the index of the pixel pattern assigned to the current block plus a third number of contents. The third number of contents is smaller than the first number of contents and larger than the second number of contents, and a bit width of the fourth coding mode is shorter than the bit width of the second coding mode and is longer than the bit width of the third coding mode.

In one implementation, the capacity of the buffer is updated after compression of each block based on the bit width of the coding mode of the current block.

In one implementation, before selecting a pixel pattern for each block, the method further includes transferring data of the plurality of pixels from RGB space into YUV color space or YCbCr color space in response to the plurality of pixels comprising three data channels.

In one implementation, before selecting a pixel pattern for each block, the method further includes downscaling the data of the plurality of pixels.

In one implementation, before selecting a pixel pattern for each block, the method further includes transferring the data of the plurality pixels from a time domain into a frequency domain.

In one implementation, before selecting a pixel pattern for each block, the method further includes quantifying the data of the plurality of pixels in the frequency domain.

In another example, a system for display is provided. The system includes a display having a plurality of pixels and a processor. The processor is configured to compress data of the plurality of pixels by grouping the plurality of pixels into a plurality of continuous blocks and selecting a pixel pattern for a current block from a plurality of pixel patterns. Each block includes a pixel array with M rows and N columns, where M and N are positive integers. A plurality of indexes are assigned to the plurality of pixel patterns one-by one. Each pixel pattern includes a pixel array of M rows and N columns, and part of pixels in the pixel array of each pixel pattern are compressed. The processor is further configured to obtain a similarity between a current block and a previous block and coding the current block through a first coding mode in response to the similarity between the current block and the previous block complying with a preset similarity or coding the current block through a second coding mode in response to the similarity between the current block and the previous block not complying with the preset similarity. The first coding mode includes an index of a pixel pattern assigned to the current block; the second coding mode includes the index of the pixel pattern assigned to the current block plus a first number of contents. A bit width of the first coding mode is shorter than a bit width of the second coding mode.

In one implementation, the processor is configured to select a pixel pattern for the current block by selecting a first group of pixels and a second group of pixels from the current block based on each pixel pattern of the plurality of pixels patterns, calculating a first average value of the first group of pixels and a second average value of the second group of pixels, and assigning a pixel pattern to the current block in response to the first average value corresponding to the pixel pattern being larger than a minimum average threshold and the second average value corresponding to the pixel pattern being smaller than a maximum average threshold. The first group of pixels are located at the same positions as the pixels not being compressed from the corresponding pixel pattern, and the second group of pixels are located at the same positions as the pixels being compressed from the pixel pattern.

In one implementation, when the current block is assigned with more than one pixel pattern, the processor is configured to select a pixel pattern for the current block by comparing more than one first average value corresponding to the more than one pixel pattern and assigning the pixel pattern with a largest first average value to the current block.

In one implementation, the processor is configured to select a pixel pattern for the current block by selecting a third group of pixels from the current block based on each pixel pattern of the plurality of pixels patterns, calculating a sum value of the third group of pixels for each pixel pattern, and assigning a pixel pattern corresponding to a largest sum value to the current block. The third group of pixels are located at the same positions as the pixels not being compressed from the pixel pattern.

In one implementation, a number of the compressed pixels in the pixel array of each pixel pattern is different from the other pixels patterns, and/or locations of the compressed pixels in the pixel array of each pixel pattern are different from the other pixels patterns.

In one implementation, the similarity includes a first difference between a value of a first group of pixels in the current block and a value of a first group of pixels in the previous block. The preset similarity is a maximum value of the first difference, and the similarity complies with the preset similarity in response to the first difference being smaller than the maximum value of the first difference.

In one implementation, the similarity includes a second difference between a value of an ith pixel in the current block and a value of an ith pixel in the previous block, where i is a positive integer and $M \times N \geq i \geq 2$, the preset similarity is a maximum value of the second difference, and the similarity complies with the preset similarity in response to the second difference being smaller than the maximum value of the second difference.

In one implementation, the similarity includes a third difference obtained by accumulating at least part of the second differences from a second pixel to a $(M \times N)$th pixel, the preset similarity is a maximum value of the third difference, and the similarity complies with the preset similarity in response to the second difference being smaller than the maximum value of the second difference.

In one implementation, the processor is further configured to obtain a flatness between the current block and the previous block in response to the similarity between the current block and the previous block does not comply with the preset similarity, code the current block through a third coding mode in response to the flatness between the current block and the previous block complying with a preset flatness, or code the current block through the second coding mode in response to the flatness between the current block and the previous block not complying with a preset flatness. The third coding mode includes the index of the pixel pattern assigned to the current block plus a second number of contents. The second number of contents is smaller than the first number of contents, and a bit width of the third coding mode is shorter than the bit width of the second coding mode and is longer than the bit width of the first coding mode.

In one implementation, the flatness includes a first ratio vector obtained by dividing the current block with an absolute value or an average value of an internal vector of the current block. The internal vector is an M-dimensional-vector or a N-dimensional-vector including a first pixel of the current bloc, the preset flatness includes an average value of the first ratio vector and a peak value of the first ratio vector, and the flatness complies with the preset flatness in response to an average value of the first ratio vector being smaller than the average value of the first ratio vector and a maximum value of the first ratio vector being smaller than the peak value of the first ratio vector.

In one implementation, the flatness includes a second ratio obtained by comparing at least one of a maximum value, a minimum value, or an average value of a second to a (M×N)th pixels of the current block with a value of a first pixel of the current block, the preset flatness is a preset scope [a, b], where a and b are positive numbers and a<1<b, and the flatness complies with the preset flatness in response to the second ratio being within the preset scope [a, b].

In one implementation, the processor is further configured to obtain a capacity of a buffer configured to store the compressed image, and code the current block through a fourth coding mode in response to the capacity of the buffer being less than a capacity threshold, code the current block through the second coding mode in response to the capacity of the buffer being larger than or equal to the capacity threshold. The fourth coding mode includes the index of the pixel pattern assigned to the current block plus a third number of contents. The third number of contents is smaller than the first number of contents and larger than the second number of contents, and a bit width of the fourth coding mode is shorter than the bit width of the second coding mode and is longer than the bit width of the third coding mode.

In one implementation, the capacity of the buffer is updated after compression of each block based on the bit width of the coding mode of the current block.

BRIEF DESCRIPTION OF THE DRAWINGS

FIG. 4 illustrates a flow chart of a method for compressing pixel data in a display panel in accordance with an implementation.

FIG. 10 illustrates a data pattern of compressed pixel data stored in a memory device in accordance with an implementation.

FIG. 11 illustrates a flow chart of a method for decompressing pixel data in a display panel in accordance with an implementation.

DETAILED DESCRIPTION

Figure 1:
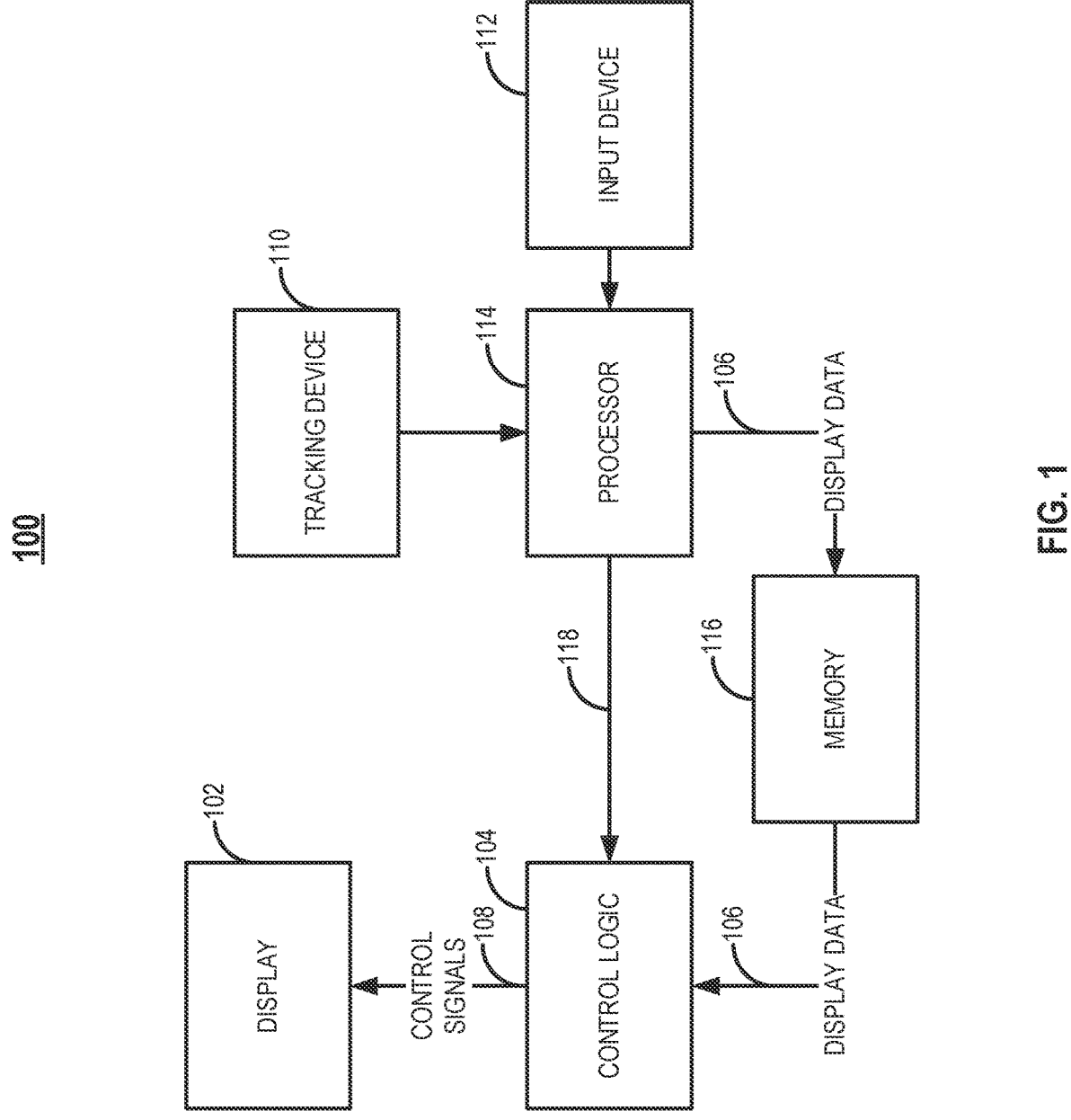
FIG. 1 is a block diagram illustrating an apparatus including a display and control logic in accordance with an implementation.

In the following detailed description, numerous specific details are set forth by way of examples in order to provide a thorough understanding of the relevant disclosures. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one implementation/example" as used herein does not necessarily refer to the same implementation and the phrase "in another implementation/example" as used herein does not necessarily refer to a different implementation. It is intended, for example, that claimed subject matter includes combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Images data need to be compressed during transmission to improve data transmission efficiency, and a higher compression rate would lead to a higher data transmission efficiency and a smaller memory capacity. However, with the increase of the compression rate, a higher performance of a producer of the display is required. An excessively large compression rate may cause the decompressed image to be distorted, resulting in a poor quality of the image presented by the display panel.

To solve the above problem, a system and method for calibrating a display are provided by the present disclosure. At least one distortion scale parameter is employed to illustrate changes in distance and orientation between the distorted pixel data and pixel data adjacent to the distorted pixel data in at least one direction.

Additional novel features will be set forth in part in the description which follows, and in part will become apparent to those skilled in the art upon examination of the following and the accompanying drawings or may be learned by the production or operation of the examples. The novel features of the present disclosure may be realized and attained by practice or use of various aspects of the methodologies, instrumentalities, and combinations set forth in the detailed examples discussed below.

For ease of description, as used herein, "data," "a piece of data," or the like refers to a set of data (e.g., compensation data or display data) that can include one or more values. In the present disclosure, for example, "pixel data" or "a piece of pixel data" refers to any number of values used for compensating one pixel. The pixel data may include at least one value each for compensating a subpixel. When a piece of data includes a single value, the "piece of data" and "value" are interchangeable. The specific number of values included in a piece of data should not be limited.

FIG. 1 illustrates an apparatus 100 including a display 102 and control logic 104. Apparatus 100 may be any suitable device, for example, a VR/AR device (e.g., VR headset, etc.), handheld device (e.g., dumb or smart phone, tablet, etc.), wearable device (e.g., eyeglasses, wrist watch, etc.), automobile control station, gaming console, television set, laptop computer, desktop computer, netbook computer, media center, set-top box, global positioning system (GPS), electronic billboard, electronic sign, printer, or any other suitable device. In this implementation, display 102 is operatively coupled to control logic 104 and is part of apparatus 100, such as but not limited to, a head-mounted display, computer monitor, television screen, dashboard, electronic billboard, or electronic sign. Display 102 may be an OLED display, liquid crystal display (LCD), E-ink display, electroluminescent display (ELD), billboard display with LED or incandescent lamps, or any other suitable type of display.

Control logic 104 may be any suitable hardware, software, firmware, or a combination thereof, configured to receive display data 106 (e.g., pixel data and compensation data) and generate control signals 108 for driving the subpixels on display 102. Control signals 108 are used for controlling the writing of display data to the subpixels and directing operations of display 102. For example, subpixel rendering algorithms for various subpixel arrangements may be part of control logic 104 or implemented by control logic 104. Control logic 104 may include any other suitable components, such as an encoder, a decoder, one or more processors, controllers, and storage devices. Control logic 104 may be implemented as a standalone integrated circuit (IC) chip, such as an application-specific integrated circuit (ASIC) or a field-programmable gate array (FPGA). Apparatus 100 may also include any other suitable component such as, but not limited to tracking devices 110 (e.g., inertial sensors, camera, eye tracker, GPS, or any other suitable devices for tracking motion of eyeballs, facial expression, head motion, body motion, and hand gesture) and input devices 112 (e.g., a mouse, keyboard, remote controller, handwriting device, microphone, scanner, etc.).

In this implementation, apparatus 100 may be a handheld or a VR/AR device, such as a smart phone, a tablet, or a VR headset. Apparatus 100 may also include a processor 114 and memory 116. Processor 114 may be, for example, a graphics processor (e.g., graphics processing unit (GPU)), an application processor (AP), a general processor (e.g., APU, accelerated processing unit; GPGPU, general-purpose computing on GPU), or any other suitable processor. Memory 116 may be, for example, a discrete frame buffer or a unified memory. Processor 114 is configured to generate display data 106 in display frames and may temporally store display data 106 in memory 116 before sending it to control logic 104. Processor 114 may also generate other data, such as but not limited to, control instructions 118 or test signals, and provide them to control logic 104 directly or through memory 116. Control logic 104 then receives display data 106 from memory 116 or from processor 114 directly. In some implementations, no control instructions 118 is directly transmitted from processor 114 to control logic 104. In some implementations, compensation data transmitted from processor 114 to memory 116 and/or from memory 116 to control logic 104 may be compressed.

In some implementations, control logic 104 is part of apparatus 100, processor 114 is part of an external device of apparatus 100, and memory 116 is an external storage device that is used to store data computed by processor 114. The data stored in processor 114 may be inputted into control logic 104 for further processing. In some implementations, no control instructions 118 is transmitted from processor 114 to control logic 104. For example, apparatus 100 may be a smart phone or tablet, and control logic 104 may be part of apparatus 100. Processor 114 may be part of an external computer that is different from apparatus 100/control logic 104. Display data 106 may include any suitable data computed by and transmitted from processor 114 to control logic 104. For example, display data may include compressed compensation data. In some implementations, display data 106 includes no pixel data. Memory 116 may include a flash drive that stores the compressed compensation data processed by processor 114. Memory 116 may be coupled to control logic 104 to input the compressed compensation data into apparatus 100 such that control logic 104 can decompress the compressed compensation data and generate corresponding control signals 108 for display 102.

Figure 2A:
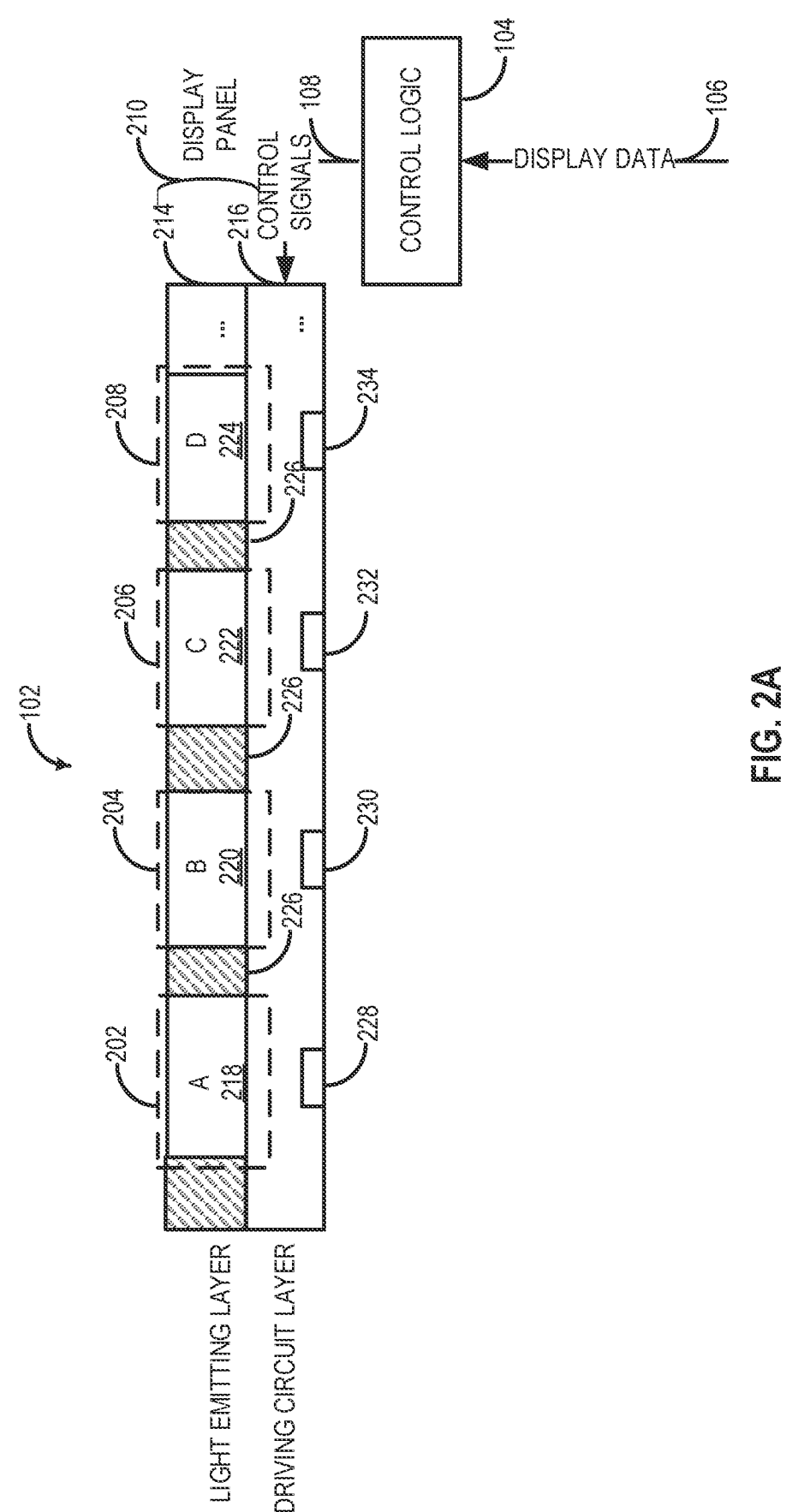
FIGS. 2A-2B are side-view diagrams illustrating various examples of the display shown in FIG. 1 in accordance with various implementations.

FIG. 2A is a side-view diagram illustrating one example of display 102 including subpixels 202, 204, 206, and 208. Display 102 may be any suitable type of display, for example, OLED displays, such as an active-matrix OLED (AMOLED) display, or any other suitable display. Display 102 may include a display panel 210 operatively coupled to control logic 104. The example shown in FIG. 2A illustrates a side-by-side (a.k.a. lateral emitter) OLED color patterning architecture in which one color of light-emitting material is deposited through a metal shadow mask while the other color areas are blocked by the mask.

In this implementation, display panel 210 includes a light emitting layer 214 and a driving circuit layer 216. As shown in FIG. 2A, light emitting layer 214 includes a plurality of light emitting elements (e.g., OLEDs) 218, 220, 222, and 224, corresponding to a plurality of subpixels 202, 204, 206, and 208, respectively. A, B, C, and D in FIG. 2A denote OLEDs in different colors, such as but not limited to, red, green, blue, yellow, cyan, magenta, or white. Light emitting layer 214 also includes a black array 226 disposed between OLEDs 218, 220, 222, and 224, as shown in FIG. 2A. Black array 226, as the borders of subpixels 202, 204, 206, and 208, is used for blocking lights coming out from the parts outside OLEDs 218, 220, 222, and 224. Each OLED 218, 220, 222, and 224 in light emitting layer 214 can emit light in a predetermined color and brightness.

In this implementation, driving circuit layer 216 includes a plurality of pixel circuits 228, 230, 232, and 234, each of which includes one or more thin film transistors (TFTs), corresponding to OLEDs 218, 220, 222, and 224 of subpixels 202, 204, 206, and 208, respectively. Pixel circuits 228, 230, 232, and 234 may be individually addressed by control signals 108 from control logic 104 and configured to drive corresponding subpixels 202, 204, 206, and 208, by controlling the light emitting from respective OLEDs 218, 220, 222, and 224, according to control signals 108. Driving circuit layer 216 may further include one or more drivers (not shown) formed on the same substrate as pixel circuits 228, 230, 232, and 234. The on-panel drivers may include circuits for controlling light emitting, gate scanning, and data writing, as described below in detail. Scan lines and data lines are also formed in driving circuit layer 216 for transmitting scan signals and data signals, respectively, from the drivers to each pixel circuit 228, 230, 232, and 234. Display panel 210 may include any other suitable component, such as one or more glass substrates, polarization layers, or a touch panel (not shown). Pixel circuits 228, 230, 232, and 234 and other components in driving circuit layer 216 in this implementation are formed on a low temperature polycrystalline silicon (LTPS) layer deposited on a glass substrate, and the TFTs in each pixel circuit 228, 230, 232, and 234 are p-type transistors (e.g., PMOS LTPS-TFTs). In some implementations, the components in driving circuit layer 216 may be formed on an amorphous silicon (a-Si) layer, and the TFTs in each pixel circuit may be n-type transistors (e.g., NMOS TFTs). In some implementations, the TFTs in each pixel circuit may be organic TFTs (OTFT) or indium gallium zinc oxide (IGZO) TFTs.

As shown in FIG. 2A, each subpixel 202, 204, 206, and 208 is formed by at least an OLED 218, 220, 222, and 224 driven by a corresponding pixel circuit 228, 230, 232, and 234. Each OLED may be formed by a sandwich structure of an anode, an organic light-emitting layer, and a cathode. Depending on the characteristics (e.g., material, structure, etc.) of the organic light-emitting layer of the respective OLED, a subpixel may present a distinct color and brightness. Each OLED 218, 220, 222, and 224 in this implementation is a top-emitting OLED. In some implementations, the OLED may be in a different configuration, such as a bottom-emitting OLED. In one example, one pixel may consist of three adjacent subpixels, such as subpixels in the three primary colors (red, green, and blue) to present a full color. In another example, one pixel may consist of four adjacent subpixels, such as subpixels in the three primary colors (red, green, and blue) and the white color. In still another example, one pixel may consist of two adjacent subpixels. For example, subpixels A 202 and B 204 may constitute one pixel, and subpixels C 206 and D 208 may constitute another pixel. Here, since the display data 106 is usually programmed at the pixel level, the two subpixels of each pixel or the multiple subpixels of several adjacent pixels may be addressed collectively by subpixel rendering to present the appropriate brightness and color of each pixel, as designated in display data 106 (e.g., pixel data). However, it is to be appreciated that, in some implementations, display data 106 may be programmed at the subpixel level such that display data 106 can directly address individual subpixel without subpixel rendering. Because it usually requires three primary colors (red, green, and blue) to present a full color, specifically designed subpixel arrangements may be provided for display 102 in conjunction with subpixel rendering algorithms to achieve an appropriate apparent color resolution. In some implementations, the resolution of each of red, green, and blue colors is equal to one another. In other implementations, the resolution of red, green, and blue colors may not all be the same.

Figure 2B:
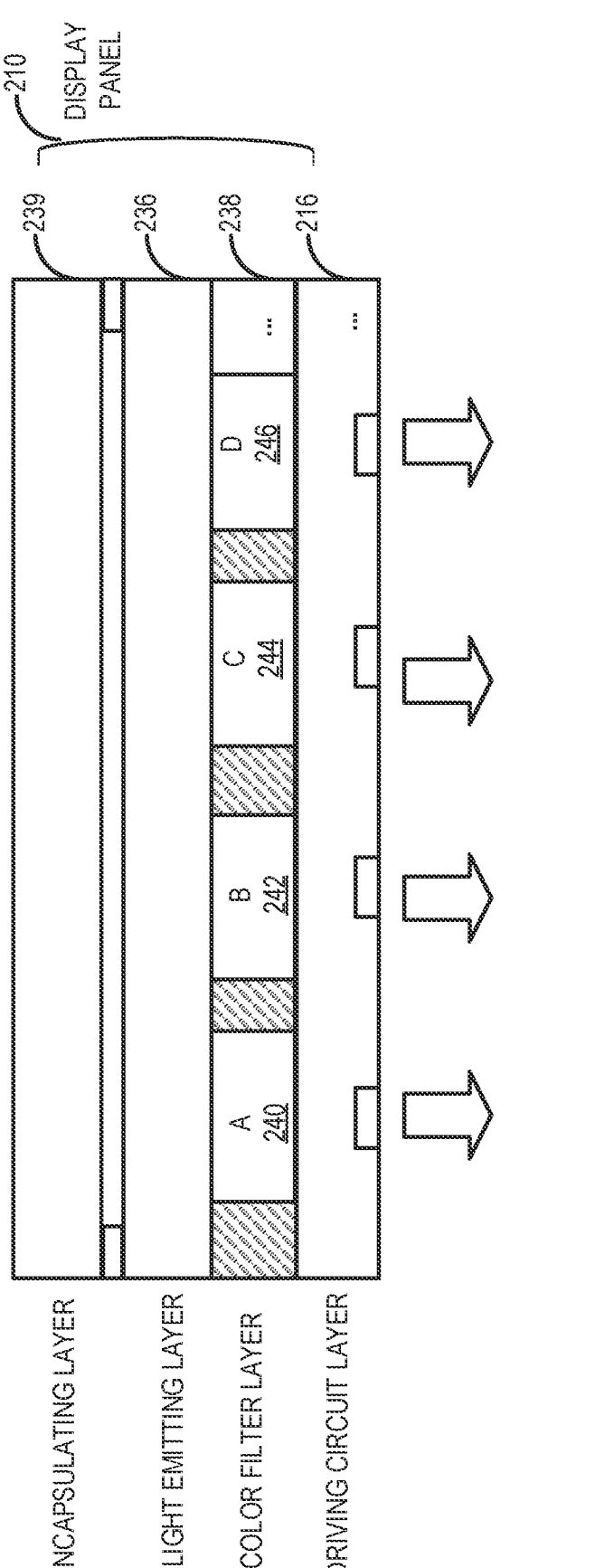

The example shown in FIG. 2A illustrates a side-by-side patterning architecture in which one color of light-emitting material is deposited through the metal shadow mask while the other color areas are blocked by the mask. In another example, a white OLEDs with color filters (WOLED+CF) patterning architecture can be applied to display panel 210. In the WOLED+CF architecture, a stack of light-emitting materials form a light emitting layer of the white light. The color of each individual subpixel is defined by another layer of color filters in different colors. As the organic light-emitting materials do not need to be patterned through the metal shadow mask, the resolution and display size can be increased by the WOLED+CF patterning architecture. FIG. 2B illustrates an example of a WOLED+CF patterning architecture applied to display panel 210. Display panel 210 in this implementation includes driving circuit layer 216, a light emitting layer 236, a color filter layer 238, and an encapsulating layer 239. In this example, light emitting layer 236 includes a stack of light emitting sub-layers and emits the white light. Color filter layer 238 may be included in a color filter array having a plurality of color filters 240, 242, 244, and 246 corresponding to subpixels 202, 204, 206, and 208, respectively. A, B, C, and D in FIG. 44B denote four different colors of filters, such as but not limited to, red, green, blue, yellow, cyan, magenta, or white. Color filters 240, 242, 244, and 246 may be formed of a resin film in which dyes or pigments having the desired color are contained. Depending on the characteristics (e.g., color, thickness, etc.) of the respective color filter, a subpixel may present a distinct color and brightness. Encapsulating layer 239 may include an encapsulating glass substrate or a substrate fabricated by the thin film encapsulation (TFE) technology. Driving circuit layer 216 may be included of an array of pixel circuits including LTPS, IGZO, or OTFT transistors. Display panel 210 may include any other suitable components, such as polarization layers, or a touch panel (not shown).

Figure 3:
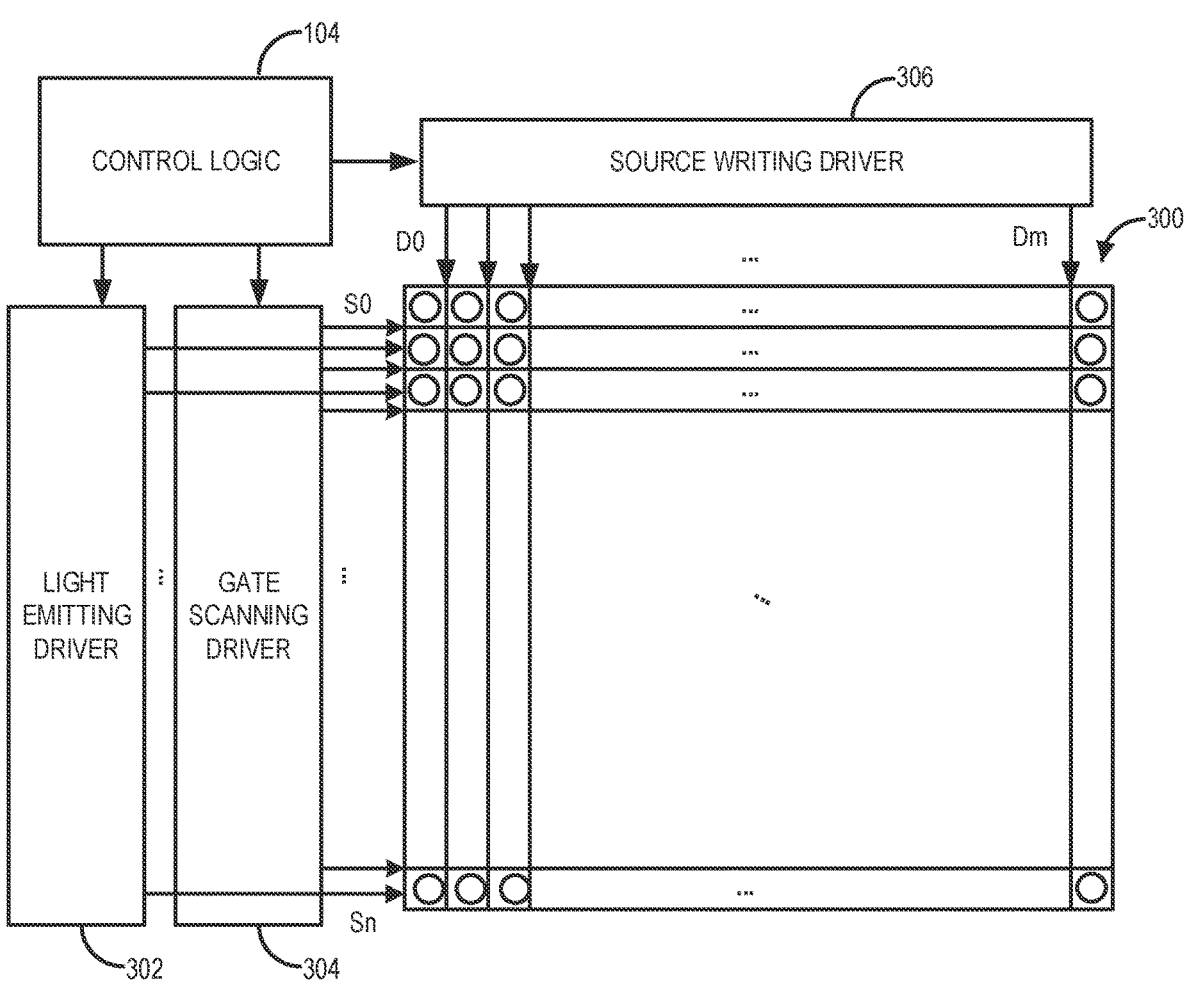
FIG. 3 is a plan-view diagram illustrating the display shown in FIG. 1 including multiple drivers in accordance with an implementation.

FIG. 3 is a plan-view diagram illustrating display 102 shown in FIG. 1 including multiple drivers in accordance with an implementation. Display panel 210 in this implementation includes an array of subpixels 300 (e.g., OLEDs), a plurality of pixel circuits (not shown), and multiple on-panel drivers including a light emitting driver 302, a gate scanning driver 304, and a source writing driver 306. The pixel circuits are operatively coupled to array of subpixels 300 and on-panel drivers 302, 304, and 306. Light emitting driver 302 in this implementation is configured to cause array of subpixels 300 to emit lights in each frame. It is to be appreciated that although one light emitting driver 302 is illustrated in FIG. 3, in some implementations, multiple light emitting drivers may work in conjunction with each other.

Gate scanning driver 304 in this implementation applies a plurality of scan signals S0-Sn, which are generated based on control signals 108 from control logic 104, to the scan lines (a.k.a. gate lines) for each row of subpixels in array of subpixels 300 in a sequence. The scan signals S0-Sn are applied to the gate electrode of a switching transistor of each pixel circuit during the scan/charging period to turn on the switching transistor so that the data signal for the corresponding subpixel can be written by source writing driver 306. As will be described below in detail, the sequence of applying the scan signals to each row of array of subpixels 300 (i.e., the gate scanning order) may vary in different implementations. In some implementations, not all the rows of subpixels are scanned in each frame. It is to be appreciated that although one gate scanning driver 304 is illustrated in FIG. 3, in some implementations, multiple gate scanning drivers may work in conjunction with each other to scan array of subpixels 300.

Source writing driver 306 in this implementation is configured to write display data received from control logic 104 into array of subpixels 300 in each frame. For example, source writing driver 306 may simultaneously apply data signals D0-Dm to the data lines (a.k.a. source lines) for each column of subpixels. That is, source writing driver 306 may include one or more shift registers, digital-analog converter (DAC), multiplexers (MUX), and arithmetic circuit for controlling the timing of application of voltage to the source electrode of the switching transistor of each pixel circuit (i.e., during the scan/charging period in each frame) and a magnitude of the applied voltage according to gradations of display data 106. It is to be appreciated that although one source writing driver 306 is illustrated in FIG. 3, in some implementations, multiple source writing drivers may work in conjunction with each other to apply the data signals to the data lines for each column of subpixels.

As described above, the system and method for compressing image data of a display panel may be performed by processor 114 or control logic 104. Processor 114 may be any processor that can generate display data 106, e.g., pixel data, in each frame and provide display data 106 to control logic 104. Processor 114 may be, for example, a GPU, AP, APU, or GPGPU. Control logic 104 may receive other data, such as but not limited to, control instructions 118 (optional in FIG. 1) or test signals (not shown in FIG. 2A) generated by processor 114. The stream of display data 106 transmitted from processor 114 to control logic 104 may include original display data and/or compensation data for pixels on display panel 210.

As described above, processor 114 may be any processor that can generate display data 106, e.g., pixel data and/or compensation data, in each frame and provide display data 106 to control logic 104. Processor 114 may be, for example, a GPU, AP, APU, or GPGPU. Processor 114 may also generate other data, such as but not limited to, control instructions 118 (optional in FIG. 1) or test signals (not shown in FIG. 2A) and provide them to control logic 104. The stream of display data 106 transmitted from processor 114 to control logic 104 may include original display data and/or compensation data for pixels on display panel 210. In the present implementation, the calibration is performed by processor 114. In other implementations of the present disclosure, the calibration may be performed by control logic 104, or a processor independent from the display system. The description of the implementations should not be explained as limitations of the present disclosure.

FIG. 4 illustrates a flowchart of a method 400 for f compressing pixel data in a display panel, such as display panel 210 described above in connection with FIG. 2A and FIG. 2B, according to some implementations of the present disclosure. It is understood that the operations shown in method 400 are not exhaustive and that other operations can be performed as well before, after, or between any of the illustrated operations. Further, some of the operations may be performed simultaneously, or in a different order than shown in FIG. 4.

Figure 5A:
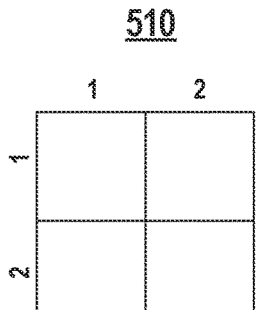
FIGS. 5A-5D illustrate a plurality of blocks with different sizes used for compressing pixel data in FIG. 4 in accordance with an implementation.
Figure 5B:
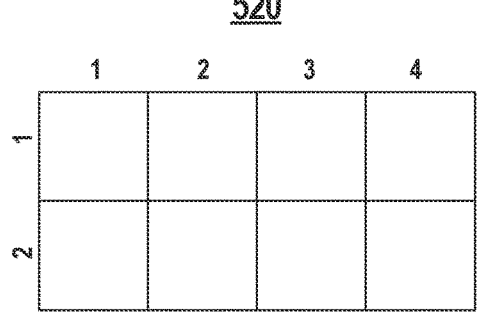
Figure 5C:
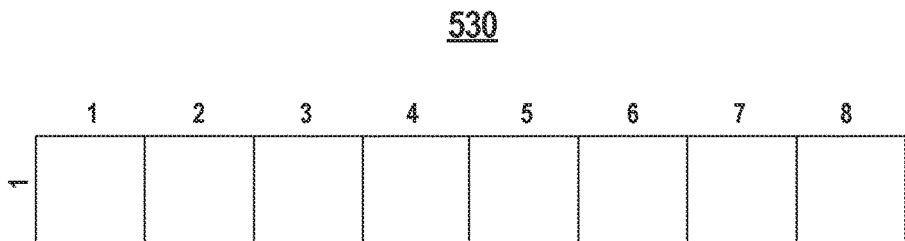
Figure 5D:
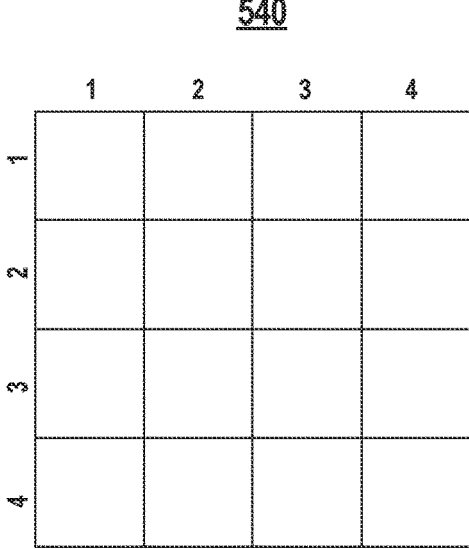

As shown in FIG. 4, method 400 can start at operation 402, in which the plurality of pixels of display panel 210 are grouped into a plurality of continuous blocks, each block comprising a pixel array with M rows and N columns, where M and N are positive integers. FIGS. 5A-5D illustrate a plurality of blocks with different sizes used for compressing pixel data in operation 402 according to different implementations of the present disclosure. For example, FIG. 5A shows an exemplary block 510 in which M=N=2, the plurality of pixels of display panel 210 are grouped into a plurality of 2×2 blocks. FIG. 5B shows an exemplary block 520 in which M=2, N=4, the plurality of pixels of display panel 210 are grouped into a plurality of 2×4 blocks. FIG. 5C shows an exemplary block 530 in which M=1, N=8, the plurality of pixels of display panel 210 are grouped into a plurality of 1×8 blocks. FIG. 5D shows an exemplary block 540 in which M=N=4, the plurality of pixels of display panel 210 are grouped into a plurality of 4×4 blocks. The size of each dimension of the block may be designed based on the needs of data compression.

Figure 6:
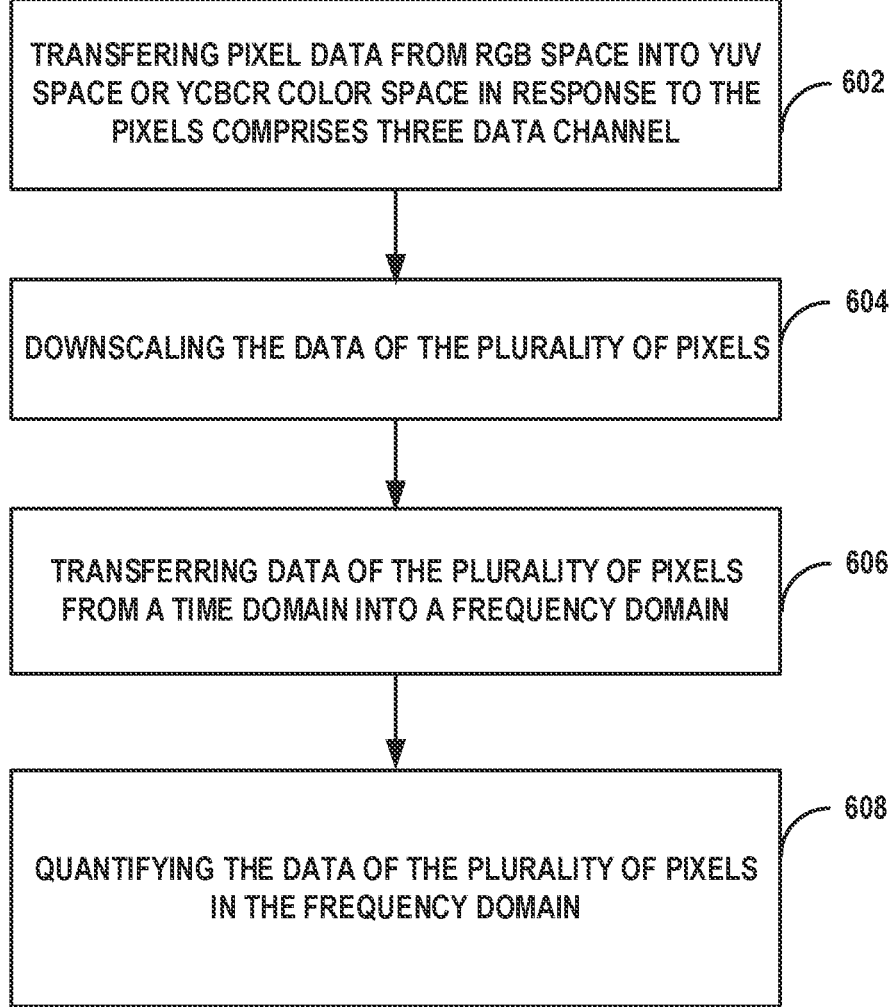
FIG. 6 illustrates a flow chart of a method for preprocessing pixel data in a display panel in accordance with an implementation.

In some implementations, before operation 402, the data of the plurality of pixels of display panel 210 are preprocessed to facilitate data compression. FIG. 6 illustrates a flowchart of a method 600 for preprocessing pixel data before operation 402 according to some implementations of the present disclosure. It is understood that the operations shown in method 600 are not exhaustive and that other operations can be performed as well before, after, or between any of the illustrated operations. Further, some of the operations may be performed simultaneously, or in a different order than shown in FIG. 6.

As shown in FIG. 6, preprocessing method 600 can start at operation 602, in which the data of the pixels of display panel 210 are transferred from RGB space into YUV color space or YCbCr color space in response to the data of the plurality of pixels comprises three data channels. Compared to the RGB space, YUV color space is designed to ease data encoding and transmission and reduce data size and information errors. The transformation can be performed through a transformation matrix T as shown in formulas (1) and (2), where [i0, i1, i2] is a vector formed by red, green, blue greyscale values of each pixel of the input image data respectively, and [o0, o1, o2] is a vector formed by an output data of YUV or YCbCr color space. In some implementations, operation 602 may be omitted in response to the data of the plurality of pixels including less than three data channels.

$$\begin{bmatrix} o0 \\ o1 \\ o2 \end{bmatrix} = T \times \begin{bmatrix} i0 \\ i1 \\ i2 \end{bmatrix} \quad (1)$$

$$T = \begin{bmatrix} a00 & a01 & a02 \\ a10 & a11 & a12 \\ a20 & a21 & a22 \end{bmatrix} \quad (2)$$

Figure 7:
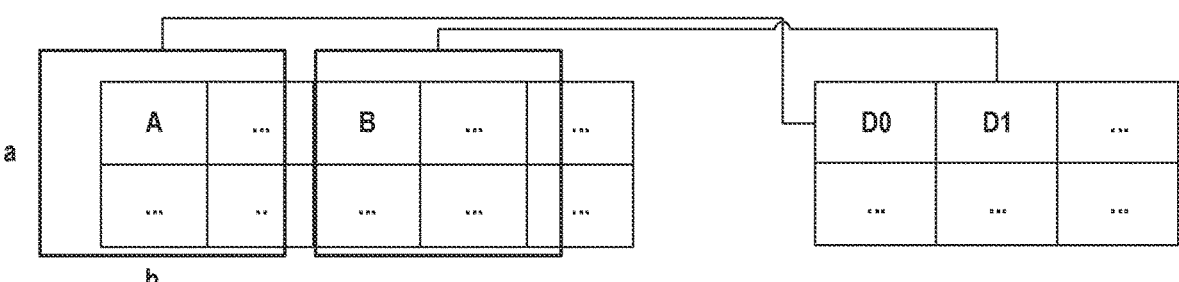
FIG. 7 illustrates a downscale process of the method for preprocessing pixel data in FIG. 6 in accordance with an implementation.

As shown in FIG. 6, preprocessing method 600 can start at operation 604, in which the data of the plurality of pixels are downscaled to facilitate compression. FIG. 7 illustrates a downscale process of the method for compressing pixel data in FIG. 6 in accordance with an implementation. A method of performing downscaling includes extracting one piece of pixel data Dvalue from a×b pixels, where a and b are positive integers, and the value of a and b are recorded for subsequential decompression. The extracted piece of pixel data Dvalue includes one of an average value, a median value, a maximum value, a minimum value, a specified value, and a gradient value, etc. The average value is an average value of greyscale values of the a×b pixels. The median value is the median value of greyscale values of the a×b pixels. The maximum value is the maximum value of greyscale values of the a×b pixels. The minimum value is a minimum value of greyscale values of the a×b pixels. The specified value is a greyscale value of a pixel located at a preset position among the a×b pixels. The gradient value is a greyscale value of a pixel located at a position at which the gradient changes the most among the a×b pixels.

As shown in FIG. 6, preprocessing method 600 can start at operation 606, in which the data of the plurality pixels are transferred from a time domain into a frequency domain. In some implementations, the time-frequency transformation can be performed through performing convolution process. The convolution matrixes used in the time-frequency transformation may be preset. For example, a convolution formula used in an implementation is shown in formular (3) below. Dvalue is the downscaled value of the a×b pixels. MQ, C0, and C1 are transmission matrices, which can be set as needed. Fvalue is transmitted data in the frequency domain.

$$Fvalue = MQ \times C0 \times Dvalue \times C1 \qquad (3)$$

Figure 8:
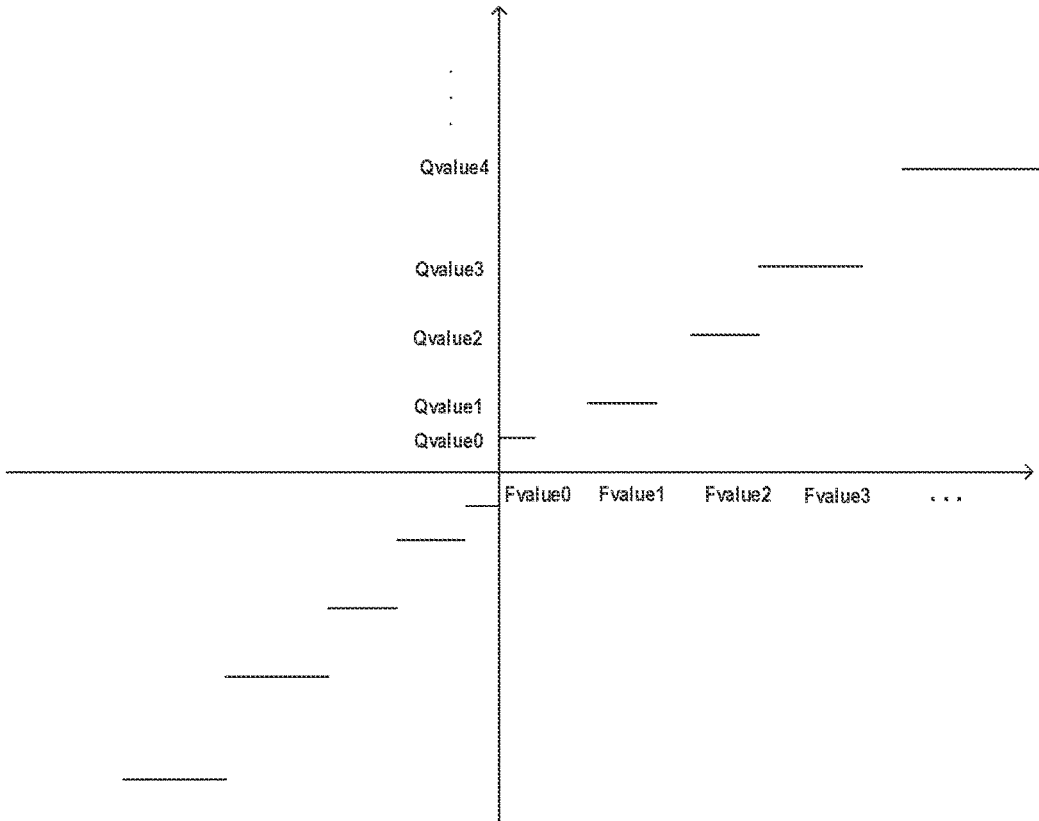
FIG. 8 illustrates a qualification process of the method for preprocessing pixel data in FIG. 6 in accordance with an implementation.

As shown in FIG. 6, preprocessing method 600 can start at operation 608, in which the data of the plurality of pixels in the frequency domain is quantified. FIG. 8 illustrates a qualification process of the method for preprocessing pixel data in FIG. 6 in accordance with an implementation. The transferred data are produced by at least one quantifying parameter and then rounded up or rounded down to obtain quantified data. For example, three quantifying formulas used in some implementations of the present disclosure are shown below, where Fvalue is the transmitted data after domain transmission, Q1 and Q2 are two parameters used to quantify the transmitted data Fvalue, and Qvalue is the quantified data. As shown below, formula (4) uses a downward rounding function to quantify the transmitted data, formula (5) uses an upward rounding function to quantify the transmitted data, and formula (6) uses a rounding function to quantify the transmitted data. The two parameters Q1 and Q2 can be designed as needed. The three formulas illustrated here are used to illustrate the present implementation and should not be explained as limits of the present disclosure.

$$Qvalue = \left\lfloor \frac{F}{Q1} \right\rfloor \times Q2. \qquad (4)$$

$$Qvalue = \left\lceil \frac{F}{Q1} \right\rceil \times Q2. \qquad (5)$$

$$Qvalue = round\left(\frac{F}{Q1}\right) \times Q2 \qquad (6)$$

As shown in FIG. 4, method 400 proceeds to operation 404 after data preprocessing, in which a pixel pattern is selected for a current block from a plurality of pixel patterns. A plurality of indexes are assigned to the plurality of pixel patterns one-by-one. Each pixel pattern includes a pixel array of M rows and N columns, which means the plurality of pixel patterns have the same shape and size as each of the plurality of the blocks of pixels. In some implementations, in operation 402, the plurality of pixels are grouped into a plurality of 4×4 blocks, as exemplary block 540 shown in FIG. 5D. Thus, the plurality of pixel patterns are designed to include a 4×4 pixel array to be consistent with the size and shape of the plurality of blocks.

Figure 9:
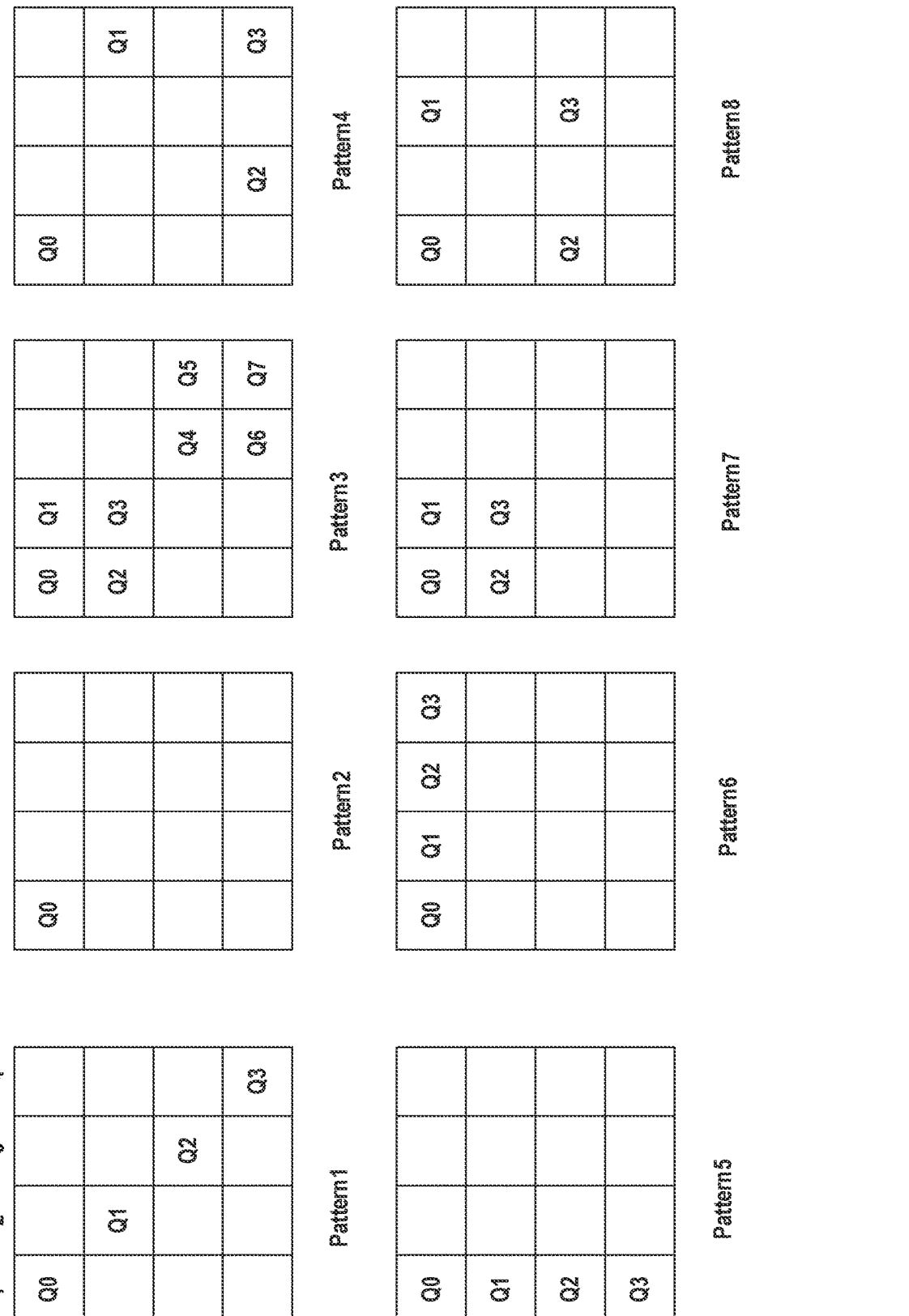
FIG. 9 illustrates a plurality of pixel patterns having a 4×4 pixel array in accordance with an implementation.

In the present disclosure, part of pixels in the pixel array of each pixel pattern are compressed. In some implementations, the number of the compressed pixels in the pixel array of each pixel pattern is different from the other pixels patterns. In some implementations, the locations of the compressed pixels in the pixel array of each pixel pattern are different from the other pixels patterns. FIG. 9 illustrates eight pixel patterns each having a 4×4 pixel array in accordance with an implementation. As shown in FIG. 9, the pixels remain in each pixel pattern represent pixels with heavier weight than the pixels being compressed, i.e., the blank positions of each pixel pattern. The distributions of the remaining pixels in the plurality of pixel patterns may be designed to cover the distributions of pixels having a heavier weight after time-frequency transformation. The number of the plurality of pixel patterns may be designed based on the size and shape of the blocks and the compression rate of data. The number of the plurality of pixel patterns may be designed as needed. The larger the number of the plurality of pixel patterns is, the longer time it would cost to select a pixel pattern for the current block from the plurality of pixel patterns. There is a tradeoff between the accuracy of the pixel patterns and the efficiency of the compression process. The number of the plurality of pixel patterns illustrated in the present disclosure is exemplary and should not be explained as limits of the present disclosure.

In some implementations, a first method may be used to select a pixel pattern for the current block. First, the first method includes selecting a first group of pixels and a second group of pixels from the current block based on each pixel pattern of the plurality of pixels patterns. Taking pixel patterns in FIG. 9 as an example, for pixel pattern 1, the first group of pixels includes pixels in position (1,1), (2, 2), (3, 3), and (4, 4) of the current block corresponding with pixel pattern 1, and the second group of pixels includes the twelve pixels in the rest position of current block. For pixel pattern 2, the first group of pixels includes a pixel in position (1,1) of the current block corresponding with pixel pattern 2, and the second group of pixels includes fifteen pixels in the rest positions of the pixels in the current block. For pixel pattern 3, the first group of pixels includes pixels in position (1,1), (1, 2), (2, 1), (2, 2), (3, 3), (3, 4), (4, 3) and (4, 4) of the current block corresponding with pixel pattern 3, and the second group of pixels includes the eight pixels in the rest position of the current block. This manner is applied to other pixel patterns as well.

Second, the first method includes calculating a first average value of the first group of pixels and a second average value of the second group of pixels. Still taking pixel patterns in FIG. 9 as an example, for pixel pattern 1, the first average value of pixel pattern 1 is an average of Q0, Q1, Q2, and Q3 located in position (1,1), (2, 2), (3, 3), and (4, 4) of the current block, the second average value of pixel pattern 1 is an average of the rest twelve pixels of the current block. Eight first average values and second average values are obtained corresponding to the eight pixel patterns, respectively, in the present implementation. For each pixel pattern, the first average value is compared with a minimum average threshold and the second average value is compared with a maximum average threshold. Then a pixel pattern is assigned to the current block in response to the first average value corresponding to the pixel pattern being larger than the minimum average threshold and the second average value corresponding to the pixel pattern beings smaller than the maximum average threshold.

In some implementations, the current block is assigned with more than one pixel pattern. For example, in the above eight pixel patterns in FIG. 9, both the first average value of pixel pattern 1 and the first average value of pixel pattern 6 are larger than the minimum average threshold, while the second average value of pixel pattern 1 and the second average value of pixel pattern 6 are smaller than the maximum average threshold. Then selection continues to pick up one from the pixel pattern 1 and pixel pattern 6. The pixels in the first group will remain, and the pixels in the second group will be compressed during compression, a lagger first average value and a smaller second average value would keep more effective information about the current block. In some implementations, the pixel pattern could be selected from the more than one pixel pattern by comparing the first average value corresponding to pixel pattern 1 and the first average value corresponding to pixel pattern 6, then assigning the pixel pattern with a larger first average value to the current block. In some implementations, the first average value corresponding to pixel pattern 1 is equal to the first average value corresponding to pixel pattern 6, then comparing the second average value corresponding to pixel pattern 1 and the second average value corresponding to pixel pattern 6, then assigning the pixel pattern with a smaller second average value to the current block.

In some implementations, a second method may be used to select a pixel pattern for the current block. First, a third group of pixels are selected from the current block based on each pixel pattern of the plurality of pixels patterns. The third group of pixels are located at the same positions as the pixels not being compressed from the pixel pattern. Then a sum value of the third group of pixels is calculated for each pixel pattern. Last, a pixel pattern corresponding to the largest sum value is assigned to the current block. In some implementations, no pixel pattern could generate a first average value larger than the minimum average threshold or a second average value smaller than the maximum average threshold. Then, the second method could be used to select a pixel pattern for the block. The second method could be used independently or as a supplement to the first method.

As shown in FIG. 4, method 400 then proceeds to operation 406 after selecting a pixel pattern for the current block, in which a similarity between the current block and a previous block is obtained.

In some implementations, the similarity includes a first difference between a value of a first group of pixels in the current block and a value of a first group of pixels in the previous block. The preset similarity is the maximum value of the first difference. The similarity complies with the preset similarity in response to the first difference being smaller than the maximum value of the first difference. In some implementations, the similarity includes a second difference between a value of an ith pixel in the current block and a value of an ith pixel in the previous block, where i is a positive integer and $M \times N \geq i \geq 2$. The preset similarity is the maximum value of the second difference, and the similarity complies with the preset similarity in response to the second difference being smaller than the maximum value of the second difference. In some implementations, the similarity includes a third difference obtained by accumulating at least part of the second differences from a second pixel to a $(M \times N)$th pixel. The preset similarity is the maximum value of the third difference, and the similarity complies with the preset similarity in response to the second difference being smaller than the maximum value of the second difference.

As shown in FIG. 4, method 400 then proceeds to operation 408 or operation 410, in which the current block is coded based on the similarity between the current block and a previous block. In some implementations, the similarity between the current block and the previous block complies with the preset similarity, then proceeds to operation 408 to code the current block through a first coding mode. In some implementations, the similarity between the current block and the previous block does not comply with the preset similarity, then proceeds to operation 410 to code the current block through a second coding mode. The first coding mode includes an index of a pixel pattern assigned to the current block. The second coding mode includes the index of the pixel pattern assigned to the current block plus a first number of contents, and a bit width of the first coding mode is shorter than a bit width of the second coding mode.

In some implementations, the similarity between the current block and the previous block does not comply with the preset similarity, before proceeding to operation 410, method 400 further includes obtaining a flatness between the current block and the previous block. In some implementations, the flatness between the current block and the previous block complies with a preset flatness, then the current block is coded through a third coding mode. In some implementations, the flatness between the current block and the previous block does not comply with a preset flatness, then the current block is coded through the second coding mode. The third coding mode includes the index of the pixel pattern assigned to the current block plus a second number of contents. The second number of contents is smaller than the first number of contents, and a bit width of the third coding mode is shorter than the bit width of the second coding mode and is longer than the bit width of the first coding mode.

In some implementations, the flatness includes a first ratio vector obtained by dividing the current block with an absolute value or an average value of an internal vector of the current block. The internal vector is an M-dimensional-vector or a N-dimensional-vector comprising a first pixel of the current block. The preset flatness includes an average value of the first ratio vector and a peak value of the first ratio vector. In some implementations, the average value of the first ratio vector is smaller than the average value of the first ratio vector and the maximum value of the first ratio vector is smaller than the peak value of the first ratio vector, then the flatness complies with the preset flatness. In some implementations, the flatness includes a second ratio obtained by comparing at least one of a maximum value, a minimum value, or an average value of a second to a $(M \times N)$th pixels of the current block with a value of a first pixel of the current block. The preset flatness is a preset scope [a, b], where a and b are positive numbers and $a < 1 < b$, and the flatness complies with the preset flatness in response to the second ratio being within the preset scope [a, b].

In some implementations, the flatness between the current block and the previous block does not comply with the preset flatness. Before proceeding to operation 410, method 400 further includes obtaining a capacity of a buffer configured to store the compressed image, the capacity of the buffer is updated after compression of each block based on the bit width of the coding mode of the current block. In some implementations, the capacity of the buffer is less than a capacity threshold, then the current block is coded through a fourth coding mode. In some implementations, the capacity of the buffer is larger than or equal to a capacity threshold, then the current block is coded through a second coding mode. The fourth coding mode includes the index of the pixel pattern assigned to the current block plus a third number of contents. The third number of contents is smaller than the first number of contents and larger than the second number of contents, and a bit width of the fourth coding mode is shorter than the bit width of the second coding mode and is longer than the bit width of the third coding mode.

Figure 10:
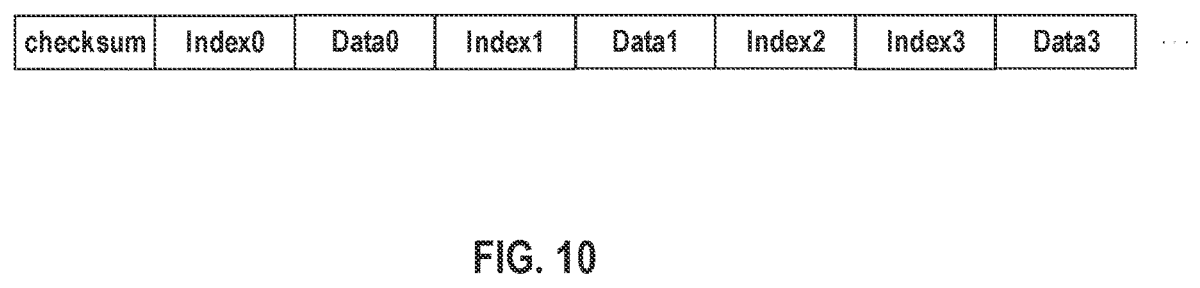

After operation 408 or operation 410, the compression of the current block is completed, the compressed data of the current block may be saved into memory 116 of the display system, or other storage device, for example, a flash or a static random-access memory (SRAM) of the display system. The compressed data could be saved in the format shown in FIG. 10. The compressed data of each block includes an index segment and a data segment. A checksum data was assigned for the compressed data of each image to verify the compressed data and could be obtained through cyclic redundancy check or other available verify code. The length of the index segment for each block is the same, and the length of the data segment for each block depends on the similarity between the current block and the previous block. In the present disclosure, when the similarity between the current block and the previous block complies with the preset similarity, the length of data of segment for the current block is the shortest compared with other situations in which the similarity between the current block and the previous block does not comply with the preset similarity. In some implementations, when the input image has a high consistency and the similarity between each two adjacent blocks is high, then the compression efficiency and the storage space of the compression of the input image will be improved significantly without sacrificing the quality of the compressed image.

The compressed data of the input image may be decompressed through an inverse process of compression. In some implementations, referring to FIG. 11, a method 1100 for decompressing the compressed image is provided. As shown in FIG. 11, method 1100 first proceeds to operation 1102, in which the data segment and the index segment of the current block are extracted from memory 116 or other storage device used to save the compressed data of the current block. The index segment of the current block indicates the data pattern of the current block, and the length of the data segment of the current block indicates the coding mode used in the compression of the current block. The data of the current block can be obtained with the index segment and the data segment saved in memory 116.

As shown in FIG. 11, method 1100 first proceeds to operation 1104, in which the data obtained during operation 1102 is inversely quantified using an inverse formula of the quantified formula used in operation 608, and the two parameters Q1 and Q2 are the same as the two parameters Q1 and Q2 used in operation 608. The inverse formulas of the three formulas used in operation 608 are shown below, in which formula (7) is an inverse formular of formula (4), formula (8) is an inverse formular of formula (5), formula (9) is an inverse formular of formula (6), Block_value is the data of the current block obtained during operation 1102, and $IQ_{value}$ is the inverse quantified data after operation 1104.

$$IQ_{value} = \left\lfloor \frac{Block\_value}{Q2} \right\rfloor \times Q1. \tag{7}$$

-continued $$IQ\text{value} = \left\lceil \frac{Block\_value}{Q2} \right\rceil \times Q1 \tag{8}$$

$$IQ\text{value} = round\left(\frac{Block\_value}{Q2}\right) \times Q1 \tag{9}$$

As shown in FIG. 11, method 1100 first proceeds to operation 1106, in which the inversely quantified data $IQ_{value}$ is inversely transferred from the frequency domain to the time domain. In some implementations, the frequency-time transformation can be performed through performing the convolution process. The convolution matrixes used in the frequency-time transformation are inverse matrixes of the matrixes used in operation 606. For example, a convolution formula (10) used in an implementation is shown below, in which iMQ, iC0, and iC1 are inverse matrixes of matrixes MQ, C0, and C1. IDvalue is transmitted data in the time domain.

$$IDvalue = iC0 \times IQvalue \times iC1 \times iMQ. \tag{10}$$

As shown in FIG. 11, method 1100 first proceeds to operation 1108, in which the transmitted data IDvalue is upscaled based on an inverse ratio of the downscale ratio used in operation 604. A method of performing upscaling includes equivalent upscaling and interpolation upscaling. By using equivalent upscaling, the upscaled data in the current block are the same as the transmitted data IDvalue. By using interpolation upscaling, the upscaled data in the current block are obtained by linear interpolation based on IDvalue.

As shown in FIG. 11, method 1100 first proceeds to operation 1110, in which the upscaled data are transferred from YUV color space or YCbCr color space to RGB space to obtain a final decompressed data of the input image. The transformation can be performed through an inverse transformation matrix iT of the transformation matrix T as shown in formula (11), and iT×T=1, as shown in formula (12). [IDvalue0, IDvalue1, IDvalue2] is a vector formed by luminance, first chrominance, and second Chrominance values of each pixel of the upscaled data respectively, and [d0, d1, d2] is a vector formed by a decompressed data of RGB color space. In some implementations, operation 1110 may be omitted in response to the data of the plurality of pixels including less than three data channels.

$$\begin{bmatrix} d0 \\ d1 \\ d2 \end{bmatrix} = iT \times \begin{bmatrix} IDvalue0 \\ IDvalue1 \\ IDvalue2 \end{bmatrix} \tag{11}$$

$$iT = \begin{bmatrix} ia00 & ia01 & ia02 \\ ia13 & ia11 & ia12 \\ ia20 & ia21 & ia22 \end{bmatrix} \tag{12}$$

The above detailed description of the disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

The invention claimed is:

1. A method for compressing image data in a display panel having a plurality of pixels, comprising:

grouping the plurality of pixels into a plurality of continuous blocks, each block comprising a pixel array with M rows and N columns, where M and N are positive integers;

transferring data of the plurality of pixels of each block from RGB space into YUV color space or YCbCr color space in response to the plurality of pixels comprising three data channels;

selecting a pixel pattern for a current block from a plurality of pixel patterns, a plurality of indexes being assigned to the plurality of pixel patterns one-by-one, each pixel pattern comprising a pixel array of M rows and N columns, and part of the pixels in the pixel array of each pixel pattern are compressed;

obtaining a similarity between a current block and a previous block; and coding the current block through a first coding mode in response to the similarity between the current block and the previous block complying with a preset similarity;

coding the current block through a second coding mode in response to the similarity between the current block and the previous block not complying with the preset similarity, wherein the first coding mode comprises an index of a pixel pattern assigned to the current block;

the second coding mode comprises the index of the pixel pattern assigned to the current block plus a first number of pixel data values of the block; and a bit width of the first coding mode is shorter than a bit width of the second coding mode.

2. The method of claim 1, selecting a pixel pattern for the current block comprising:

selecting a first group of pixels and a second group of pixels from the current block based on each pixel pattern of the plurality of pixel patterns;

calculating a first average value of the first group of pixels and a second average value of the second group of pixels; and assigning a pixel pattern to the current block in response to the first average value corresponding to the pixel pattern being larger than a minimum average threshold and the second average value corresponding to the pixel pattern being smaller than a maximum average threshold, wherein the first group of pixels is located at a same positions as the pixels not being compressed from the corresponding pixel pattern; and the second group of pixels is located at same positions as the pixels being compressed from the pixel pattern.

3. The method of claim 2, when the current block is assigned with more than one pixel pattern, selecting a pixel pattern from the more than one pixel pattern by:

comparing more than one first average value corresponding to the more than one pixel pattern; and assigning the pixel pattern with a largest first average value to the current block.

4. The method of claim 1, selecting a pixel pattern for the current block comprising:

selecting a third group of pixels from the current block based on each pixel pattern of the plurality of pixel patterns;

calculating a sum value of the third group of pixels for each pixel pattern; and assigning a pixel pattern corresponding to a largest sum value to the current block, wherein the third group of pixels is located at a same positions as the pixels not being compressed from the pixel pattern.

5. The method of claim 1, wherein a number of the compressed pixels in the pixel array of each pixel pattern is different from the other pixel patterns; and locations of the compressed pixels in the pixel array of each pixel pattern are different from those of the other pixel patterns.

6. The method of claim 1, wherein the similarity comprises a first difference between a value of a first group of pixels in the current block and a value of a first group of pixels in the previous block;

the preset similarity is a maximum value of the first difference; and the similarity complies with the preset similarity in response to the first difference being smaller than the maximum value of the first difference.

7. The method of claim 1, wherein the similarity comprises a second difference between a value of an ith pixel in the current block and a value of an ith pixel in the previous block, where i is a positive integer and $M \times N \geq i \geq 2$;

the preset similarity is a maximum value of the second difference; and the similarity complies with the preset similarity in response to the second difference being smaller than the maximum value of the second difference.

8. The method of claim 7, wherein the similarity comprises a third difference obtained by accumulating at least part of the second differences from a second pixel to a $(M \times N)$th pixel;

the preset similarity is a maximum value of the third difference; and the similarity complies with the preset similarity in response to the second difference being smaller than the maximum value of the second difference.

9. The method of claim 1, further comprising:

obtaining a flatness between the current block and the previous block in response to the similarity between the current block and the previous block does not comply with the preset similarity;

coding the current block through a third coding mode in response to the flatness between the current block and the previous block complying with a preset flatness;

coding the current block through the second coding mode in response to the flatness between the current block and the previous block not complying with a preset flatness; wherein the third coding mode comprises the index of the pixel pattern assigned to the current block plus a second number of pixel data values of the block;

the second number is smaller than the first number; and a bit width of the third coding mode is shorter than the bit width of the second coding mode and is longer than the bit width of the first coding mode.

10. The method of claim 9, wherein the flatness comprises a first ratio vector obtained by dividing the current block by an absolute value or an average value of an internal vector of the current block;

the internal vector is an M-dimensional-vector or a N-dimensional-vector comprising a first pixel of the current block;

the preset flatness comprises an average value of the first ratio vector and a peak value of the first ratio vector; and the flatness complies with the preset flatness in response to an average value of the first ratio vector being smaller than the average value of the first ratio vector and a maximum value of the first ratio vector being smaller than the peak value of the first ratio vector.

11. The method of claim 9, wherein the flatness comprises a second ratio obtained by comparing at least one of a maximum value, a minimum value, or an average value of a second to a (M×N)th pixels of the current block with a value of a first pixel of the current block;

the preset flatness is a preset scope [a, b], where a and b are positive numbers and a<1<b; and the flatness complies with the preset flatness in response to the second ratio being within the preset scope [a, b].

12. The method of claim 9, further comprising:

obtaining a capacity of a buffer configured to store the compressed image; and coding the current block through a fourth coding mode in response to the capacity of the buffer being less than a capacity threshold;

coding the current block through a second coding mode in response to the capacity of the buffer being larger than or equal to a capacity threshold, wherein the fourth coding mode comprises the index of the pixel pattern assigned to the current block plus a third number of pixel data values of the block;

the third number of contents is smaller than the first number and larger than the second number; and a bit width of the fourth coding mode is shorter than the bit width of the second coding mode and is longer than the bit width of the third coding mode.

13. The method of claim 12, wherein the capacity of the buffer is updated after compression of each block based on the bit width of the coding mode of the current block.

14. The method of claim 1, wherein before selecting a pixel pattern for each block, further comprises downscaling the data of the M×N pixels in the current block.

15. The method of claim 14, wherein before selecting a pixel pattern for each block, further comprises transferring the data of the M×N pixels in the current block from a time domain into a frequency domain.

16. The method of claim 15, wherein before selecting a pixel pattern for each block, further comprises quantifying the data of the M×N pixels in the frequency domain.

17. A system for display, comprising:

a display having a plurality of pixels;

a processor configured to compress data of the plurality of pixels by:

grouping the plurality of pixels into a plurality of continuous blocks, each block comprising a pixel array with M rows and N columns, where M and N are positive integers;

transferring data of the plurality of pixels of each block from RGB space into YUV color space or YCbCr color space in response to the plurality of pixels comprising three data channels;

selecting a pixel pattern for a current block from a plurality of pixel patterns, a plurality of indexes being assigned to the plurality of pixel patterns one-by-one, each pixel pattern comprising a pixel array of M rows and N columns, and part of the pixels in the pixel array of each pixel pattern are compressed;

obtaining a similarity between a current block and a previous block; and coding the current block through a first coding mode in response to the similarity between the current block and the previous block complying with a preset similarity;

coding the current block through a second coding mode in response to the similarity between the current block and the previous block not complying with the preset similarity, wherein the first coding mode comprises an index of a pixel pattern assigned to the current block;

the second coding mode comprises the index of the pixel pattern assigned to the current block plus a first number of pixel data values of the block; and a bit width of the first coding mode is shorter than a bit width of the second coding mode.

18. The system of claim 17, wherein the processor is configured to select a pixel pattern for the current block by:

selecting a first group of pixels and a second group of pixels from the current block based on each pixel pattern of the plurality of pixel patterns;

calculating a first average value of the first group of pixels and a second average value of the second group of pixels; and assigning a pixel pattern to the current block in response to the first average value corresponding to the pixel pattern being larger than a minimum average threshold and the second average value corresponding to the pixel pattern being smaller than a maximum average threshold, wherein the first group of pixels is located at same positions as the pixels not being compressed from the corresponding pixel pattern; and the second group of pixels is located at same positions as the pixels being compressed from the pixel pattern.

19. The system of claim 17, the processor is configured to select a pixel pattern for the current block by:

selecting a third group of pixels from the current block based on each pixel pattern of the plurality of pixel patterns;

calculating a sum value of the third group of pixels for each pixel pattern; and assigning a pixel pattern corresponding to a largest sum value to the current block, wherein the third group of pixels is located at same positions as the pixels not being compressed from the pixel pattern.

* * * * *